United States Patent [19]

Larsson

[11] Patent Number: 5,036,341

[45] Date of Patent: Jul. 30, 1991

[54] METHOD FOR PRODUCING A LATENT ELECTRIC CHARGE PATTERN AND A DEVICE FOR PERFORMING THE METHOD

[75] Inventor: Ove Larsson, Göteborg, Sweden

[73] Assignee: Ove Larsson Production AB, Sweden

[21] Appl. No.: 476,467

[22] PCT Filed: Nov. 30, 1988

[86] PCT No.: PCT/SE88/00653

§ 371 Date: Jun. 7, 1990

§ 102(e) Date: Jun. 7, 1990

[87] PCT Pub. No.: WO89/05231

PCT Pub. Date: Jun. 15, 1989

[30] Foreign Application Priority Data

Dec. 8, 1987 [SE] Sweden ............................... 8704883

[51] Int. Cl.[5] ............................................ G01D 15/06

[52] U.S. Cl. .................................................... 346/154

[58] Field of Search .............................. 346/153.1, 154

[56] References Cited

U.S. PATENT DOCUMENTS

| | | | |
|---|---|---|---|
| 3,653,065 | 3/1972 | Brown, Jr. | 346/154 |
| 3,725,950 | 4/1973 | Lamb | 346/154 |
| 4,086,088 | 4/1978 | Toepke | 346/153.1 |
| 4,448,867 | 5/1984 | Ohkubo et al. | 346/153.1 X |
| 4,799,070 | 1/1989 | Nishikawa | 346/153.1 X |

*Primary Examiner*—George H. Miller, Jr.

*Attorney, Agent, or Firm*—Ostrolenk, Faber, Gerb & Soffen

[57] ABSTRACT

The invention refers to a method for producing a latent electric charge pattern of electric signals and development thereof on an information carrier by means of pigment particles. The information carrier (3) is brought in electric cooperation with at least one screen- or lattice-shaped matrix, preferably an electrode matrix (4, 5, 6) which by way of control opens and closes passages through the matrix in accordance with the configuration of the desired pattern, by means of galvanic connection thereof to at least one voltage source, and that through the passages thus opened is exposed an electric field for attraction of the pigment particles against the information carrier. The invention also relates to a device for performing the method.

15 Claims, 12 Drawing Sheets

METHOD FOR PRODUCING A LATENT ELECTRIC CHARGE PATTERN AND A DEVICE FOR PERFORMING THE METHOD

The invention refers to a method for producing a latent electric charge pattern from electric signals and developing this on an information carrier by means of pigment particles and devices for performing the method.

BACKGROUND OF THE INVENTION

When printing from computers or when copying entire digitalized pages with high resolution on so called page printers, there are created latent invisible electrostatically charged dots on a surface intended for the purpose, which dots together form a pattern, which shall correspond to the text or image intended to be printed.

During the subsequent step of the process this surface with its electrostatic screen pattern commonly is conveyed in front of adjacent charged particles, e.g. toner. By causing a sufficient potential difference between the screen dots, which shall remain non-blackened and the screen dots intended to be blackened by toner, it is effected that the charged particles jump over from a conveyor device, hereinafter referred to as the developer, to the surface charged in screen shape and form desired pattern. This part of the process hereinafter is named development.

This method earlier has been realized by using the technique now current in copying apparatuses—xerography, or similar variants of this process. Common for most page printers available on the market today is that they use an intermediate storing medium, often in form of a conductive roller, which is charged to a desired charge pattern, coated with carbon powder and which is finally brought to give off a carbon pattern to a paper or the like.

The most common method hereby is to use a photoconductice roller, which is designed as a light sensitive surface layer, e.g. amorphous selenium or amorphous silicon. This roller is exposed dot-by-dot, often with monochromatic light, e.g. from a laser, as it rotates in front of the shutter of the light source. Another less frequent method is to deposit ions from a device down onto a drum coated with a surface layer suitable for the purpose.

Further another commercially unusual method is to use a particular paper coated with a conductive surface layer, e.g. zinc oxide, and to allow this to constitute the intermediary layer for the latent electrostatic image. The paper hereby passes a matrix of electrodes arranged orthogonally to the plane of the paper, which electrodes charge the surface layer of the paper to the desired screen image.

Common to all hitherto used methods are the high complexity of the equipment, a time consuming process and high service and maintenance requirements. A typical demand for resolution on the market today is 300 dots per inch. This demand for performance puts high requirements on tolerance and optical performance. Due to the short life span of conductive coatings and the comprehensive mechanism required for creating a xerographic process the above decribed methods result in high investment and operation costs for the user.

This becomes still more stressed for printers with high speed and resolution performances, where the requirements on the charging process of the drum increases the costs for the manufacturers. The method to use intermediate storing medium, in form of a conductive drum, for the electrostatic charges, also implies that a certain amount of toner will stick to the drum after the transfer to the paper was intended to take place. Such a device thus must also incorporate equipment for cleaning the drum after every single printing operation. This means more components and increased contamination with residual toner.

In order finally to create a good and permanent attraction power between the transferred particles and the paper, the paper usually passes a heating press intended for the purpose and consisting of two heated rollers being capable to melt the plastic layer on the particles, This equipment of course also increases the cost for the manufacture and reduces the accessibility of the machine.

The xerographic process furthermore involves a number of limitations regarding the quality of the print. Such a limitation is constituted by the unability of the intermediate storing medium to store high potential differences between white and black areas in a surface with a lower degree of blackening and a lower focusing as result. Another limitation is constituted by difficulties to control the individual size of the screen dots. This property causes inconvenience at reproduction of so called half-tone originals, where the size of every seprate screen dot represents a certain monochrome scale. For this purpose it has hereby been necessary to reserve a suitable number of adjacent screen dots at the printer for every new separate screen dot in the half-tone image. In this manner it is thereby possible to activate a suitable number of the printer screen dots for the purpose of varying the visual impression of the size of the screen dots of the half-tone image. This method reduces the resolution of the half-tone image as compared to the original performance of the printer.

It is earlier known, e.g. from U.S. Pat. No. 4338615 (Nelson, et al.), that many of those shortcomings are entirely or partly eliminated by letting a number of so called needle electrodes, which are orthogonal to the information carrier, be in electrostatic cooperation with the development process. As earlier known devices use needle electrodes, which can be individually activated, these always are arranged in one row or in a small number of rows, which rows often are of the same length as the width of the paper web, which is movable relative to the rows of needle electrodes which can be activated individually and are grouped in matrices on heads that are movable relative to the paper web. These methods incorporate a number of controllable screen dots for the entire printed page. As the electrostatic forces act upon a surface which during every moment of the development process, is bigger than the overall electrode size at these methods, the methods also must rely upon a conductive storing possibility for the adjacent screen dots, which risk to be blackened, as they are not in electrostatic cooperation with the electrodes. These methods therefore can not quite solve the above problems.

It furthermore has been established that non-permanent data representation from computers via viewing screens causes the operator inconveniences such as impaired readability and in certain cases radiation problems. Due to the requirements for speed in this information exchange the task has earlier been solved with aid of electron beam tubes, liquid crystals or plasma screens. A common characteristic for these methods is however the reduced readability.

The Purpose and Most Important Features of the Invention

The purpose of the invention is to create a method which gives high quality prints of good readability without any intermediate storing medium and which therefore can present a device having a few movable components and lower complexity. It is hereby intended that the entire or suitably chosen parts of the surface, which shall be coated with black is in electric, preferably electrostatic cooperation with the power source forming part of the device, and which generates forces for the pigment particles, during the entire course of the development. This implies lower manufacturing costs for the printer manufacturer and lower operation costs for the user as the method requires a smaller number of parts in the device. The invention results in that the process does not require equipment for optic production of the electrostatic image. The device neither needs any conductive intermediate layer of limited life span.

The invention may either be used for permanent fixed prints in a printer or for temporary data representation on a viewing screen.

When used in a printer the method can make possible on one hand direct printing in that the field lines are caused to act through the paper or the like, whereby the the paper is applied to the surface of the electrode matrix prior to the development and that the electrostatic forces acting in the device are caused to act through the paper, and on the other hand indirect printing by first developing the desired image on the surface of the electrode matrix and subsequently to transfer the image to a printing medium, e.g. paper. Both these utilizations of the invention mean higher efficiency for the quantity of toner transferred to the paper, as compared to existing methods, as the first utilization gives a 100% efficiency and the second utilization guarantees full control of the process forces between the surface of the electrode matrix, the blackening particles and the paper. When a conductive intermediate layer is used the electrostatic forces generated between the drum and the toner remain uninfluenced during the course of the process. This can be avoided only in that the developed surface is in direct contact with the force generating members during the entire course of the process.

The method gives possibilities to develop printers of higher speed and resolution performances at lower manufacturing costs compared to conventional technique, as the time critical course of the process is confined to the development. Devices which allow short time progress at development exist today developed to low manufacturing costs.

The electrode matrix can also if desired be used for heating the paper and thereby causing that the printed image is made permanent direct at development.

A further purpose of the invention is to eliminate, entirely or partly, some of the limitations existing in methods incorporating conductive intermediary layers. Therefore, the invention also provides a better printing performance in some considerations. The invention e.g. allows analogous control of the size and the position of every individual screen dot, which substantially improves the ability of the device to reproduce half-tone images with monochrome scales in a natural manner and allows the final printed resolution to be a matter of software control.

When used as a viewing screen or a display unit the particles are never fixed on the information carrier, but can at any time during the process be removed from this by applying suitable repelling voltages to the suitable electrodes of the matrix. This means that the invention provides a technique for information, the readability of which can be compared to a printed paper.

These tasks have been solved by allowing the surface which is in close proximity of the development process and which is intended to be coated with blackening particles to be in electrostatic cooperation with an electrode matrix, which in turn can be galvanically connected to required voltage sources.

The electrode matrix consists of two layers with several longitudinally parallel electrodes in each layer. The electrodes are adapted to be mainly parallel with the plane of the paper in their longitudinal direction. The layers are mutually arranged to form with the longitudinal extension of their electrodes a bar pattern, which must not be right-angled. Each separate electrode is in contact with a switch which can put the electrode in galvanic contact with at least two voltage supplies, which are independent of each other, whereby one of them may represent the zero potential.

It is hereby possible in a controlled manner to screen off an electric field situated behind the pigment particles and attracting them.

By connecting the electrodes in the matrix in a frequent scanning sequence it is possible to create optional passages in electrode crossings and/or in electrode interspaces, whereby the above-mentioned field may attract pigment particles and convey them to an information carrier. The method allows every single screen dot at each moment of time during the entire development process to be adressed from a control unit, as the number of required electrodes forming part of the device is substantially smaller than the number of screen dots for a page. The eight and a half million screen dots of an A4-page with 300 dots per inch can e.g. be individually activated by 59OO electrodes sequentially connected to as many switches in accordance with the invention. This method gives possibilities of new and simplified printers, some characterized in that the electrode matrix can act as a conveyor for the paper, whereby the positioning and forces of the paper relative to the surface of the matrix is obtained with vacuum or electrostatic forces. Other devices according to the invention are characterized in that development can be effected directly upon the lowermost paper in a stack of unprinted papers. It has further been made possible that certain embodiments need no additional equipment for thermally permanenting the print. This has been solved in that either current are allowed to pass through the electrodes, whereby the matrix can act as a resistive thermoelement or by letting the matrix incorporate an additional separate layer having this property.

A printer according to the invention thus could consist of two stacks of paper, one for un-printed and the other for printed papers, a developer located between them, a matrix which is displaceable between those two stacks and below the developer and which is provided with vacuum equipment and necessary driving and surrounding equipment.

A viewing screen with smaller outer dimensions can be obtained in a similar manner.

DESCRIPTION OF THE EMBODIMENTS

Figure 1:
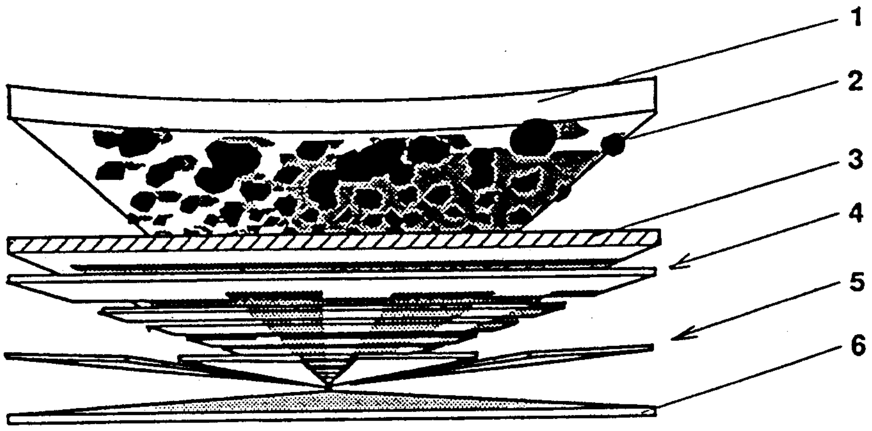
FIG. 1 shows a portion in perspective of an electrode matrix with plate electrode situated therebehind and developer.
Figure 2:
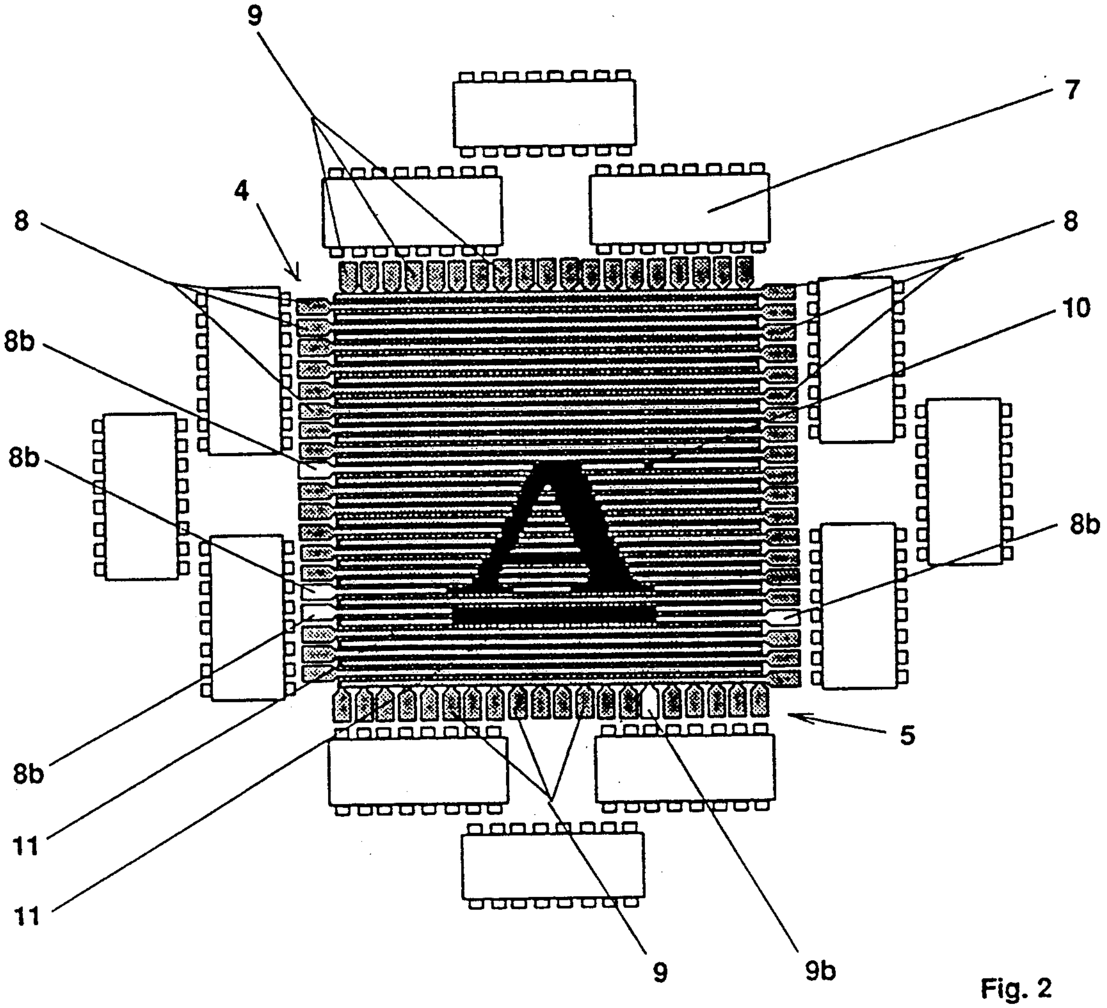
FIG. 2 shows an electrode matrix with schematical switches, as seen from above from the developer.

In the drawings in FIG. 1–15, which show embodiments of electrode matrices, reference is made to:

1—a portion of a developer.

2—a pigment particle.

3—an information carrier, e.g. a paper or a bright polished surface on the electrode unit 12.

4—an electrode layer most adjacent to the developer, named control layer.

5—an electrode layer situated behind the control layer as seen from the developer, named the scanning layer.

6—a plate electrode located behind the scanning layer as seen from the developer.

7—a switch gear comprising one or more switches.

8—an electrode of the control layer 4.

8*b*—an electrode in the control layer connected to a voltage adapted for obtaining blackening and called black voltage.

9—an electrode in the scanning layer 5.

9*b*—an electrode in the scanning layer connected to a voltage adapted for obtaining blackening and called black voltage.

10—a screen dot e.g. a cluster of pigment particles, the size of which is predictable.

11—a graphic object, e.g. a letter or line, composed of a number of screen dots.

12—an electrode unit e.g. a supporting element for the electrode matrix and possibly plate electrode, a moulded plastic member which encloses said elements.

13—a connecting device, e.g. a cable for application of the plate electrode voltage.

14—a D.C. source with variable current direction and voltage.

15—a field line between a plate electrode and one or more pigment particles.

16—a field line between a plate electrode and an electrode in the control or scanning layers, connected to a voltage adapted for screening off said field, and named white voltage.

17—a field line between a scanning layer electrode connected to black voltage and one or more pigment particles.

18—a field line between a scanning layer electrode connected to black voltage and a control layer electrode applied to a voltage adapted for screening off said field, and named white voltage.

60—a magnetic pole shoe mounted in a developer 1 with a small and well defined slot from a conveyor roller 63 for the purpose of metering an appropriate amount of pigment particles onto said roller.

61—a screening device which partially encloses a conveyor roller 63 and which device is arranged to form a slot towards a second screening device 62.

62—a screening device which partially encloses a conveyor roller 63, electrode layer 4 and connection cables 64.

63—a conveyor roller enclosing magnets for transport of magnetic pigment particles 2 from the container of the developer 1 to the paper 3.

64—a connecting cable for the electrodes mounted on a developer 1.

65—an electric conducting device for transport of the paper 3 in front of

66—a frame for supporting glass 69 and electrode unit 12.

67—air-suspended pigment particles between a glass 69 and an electrode unit 12, which particles can hardly be discovered visually through the glass 69.

68—a connection for circulation of the particles.

69—a glass pane.

70—a complete print cartridge.

71—a toner container.

73—a print slot.

74—a connector for individually connection of the electrodes to the controller.

75—a conductive ring shaped member of the developer roller placed in the valleys in between concentrically arranged electrodes (9').

76—a insulating pipe shaped member of the developer roller.

77—a cleaning blade.

78—a brush or other sliding device performing an individually galvanic contact with each electrode.

79—a blade of magnetic material used to uniformly apply a magnetic toner onto the developer roller.

80—a fixed magnetic core inside the developer roller.

Figure 4A:
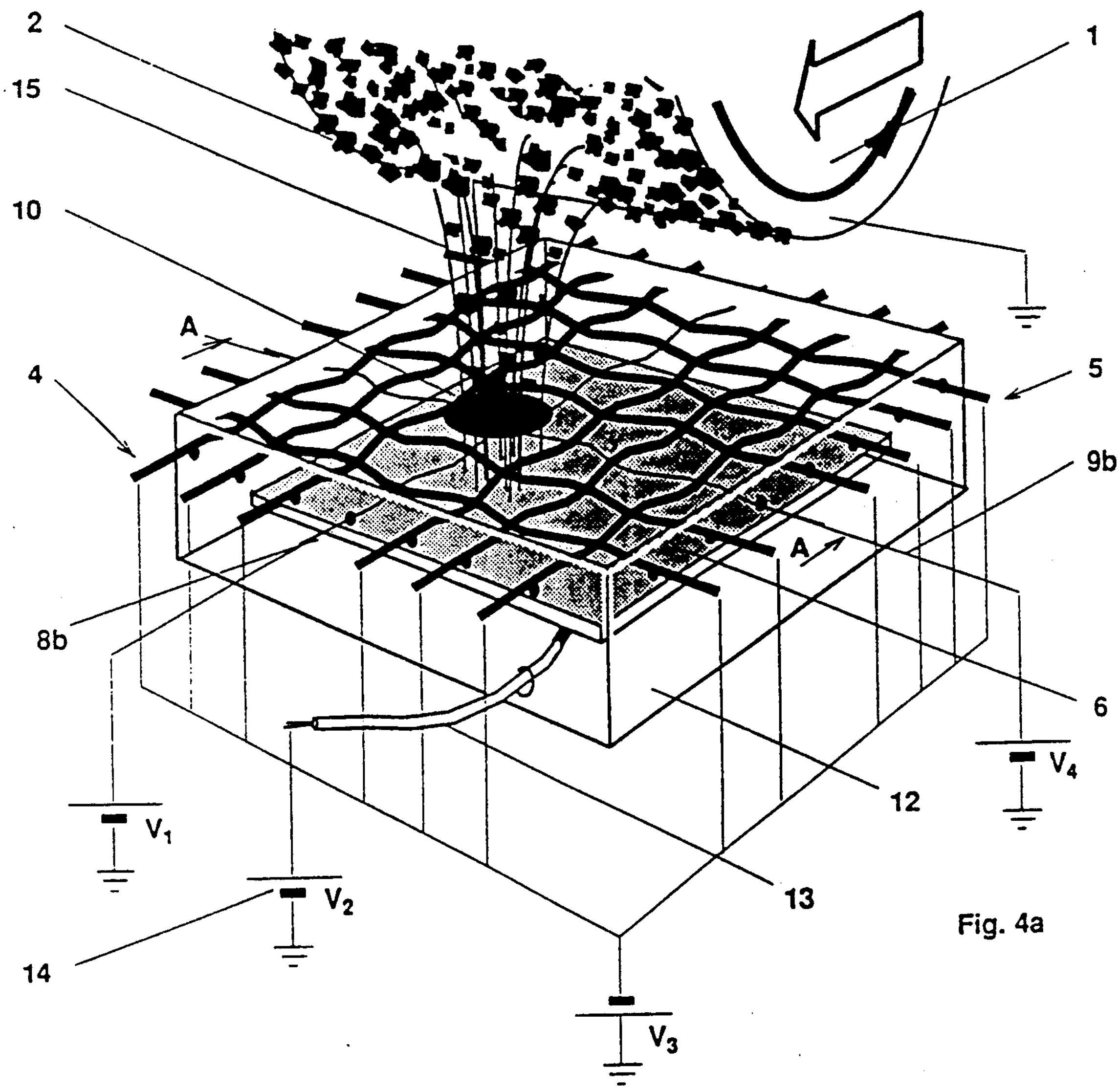
FIG. 4*a* shows an encased net-shaped electrode matrix with plate electrode and part of a developer in perspective. The figure illustrates how the pigment particles are sucked from the developer down to the desired dot.
Figure 4B:
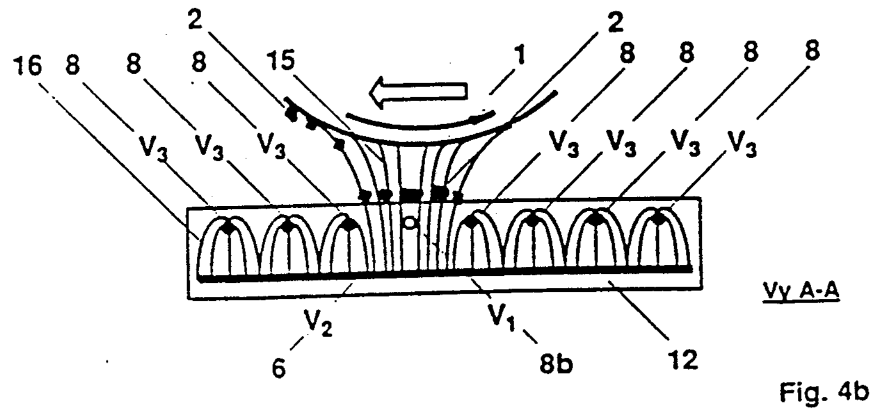
FIG. 4*b* shows a section along line A—A in FIG. 4*a*, where the fundamental appearance of the field lines can be seen.

The method according to which the invention may be utilized makes possible different principles for the design and function of the electrode matrix. According to one of the principles the electrode matrix 4 and 5 shall be located between the surface to be developed and a plate electrode 6 having about the same dimensions as the matrix. The electrodes of the matrix, which may be wire-shaped with round cross section, then shall be considerably smaller, in the transverse direction of the wire, than the space between each two electrodes. The matrix, which may be a net woven from wires covered with an insulating varnish, then will have meshes delimited by two adjacent electrodes in one of the layers 4 and by two adjacent electrodes in the second layer 5. Such an embodiment is shown in FIG. 4*a*. FIG. 1 shows another embodiment with rectangular cross section on the electrodes, where the layers are not interwoven, but attached separately e.g. to an insulating plastic film, which is not shown in the figure. Each mesh, in both embodiments, forms a possibility to penetrate through the matrix for the electrostatic field 15, which will be formed between the pigment particles 2 on the developer 1 and the plate electrode 6, which is connected to a voltage appropriate for the attraction of the particles and which is named $V_2$ in FIG. 4*a*. Such a possibility is hereinafter referred to as a passage. By varying the voltage of the electrodes the electrostatic permeability of the passages will vary. That is, if a sufficiently high voltage acting repelling on the pigment particles, and being called a white voltage $V_3$ in FIG. 4*a* is applied to all electrodes in both layers all passages will be closed for the field lines 15 between the developer 1 and the plate electrode 6, whereby the field lines 16 will extend between the plate electrode 6 and the electrodes connected to white voltage, the entire surface then will repel the particles 2 and will remain white after development.

By lowering the repelling voltage for an electrode 9*b* in one of the layers 5, called the scanning layer, and for an appropriate number of electrodes 8*b* in the second layer 4, called the control layer, somewhat down towards the attracting voltage, called black voltage, which is present on the plate electrode, areas around the crossing points for electrodes of black voltage $V_1$ and $V_4$ in FIG. 4*a* will allow the field lines 15 to reach the pigment particles 2 on the developer 1 from the plate electrode 6. This is shown fundamentaly for a section along line A—A in FIG. 4*b*. This in turn means that a certain amount of particles will come loose from the developer and be deposited on the surface of the electrode matrix in the regions 10 situated about the crossing points for the electrodes having the black voltage $V_1$ and $V_4$. In this manner it will become possible to create an optional number of blackened screen dots 10, limited to their number by the number of crossings, along a line represented by an electrode 9*b* in the scanning layer 5.

By moving the black voltage $V_4$ step-by-step to adjacent electrodes in the scanning layer in a frequent repetitive cyclic course, so called scanning, it is possible at each new electrode in the scanning layer to activate and blacken new optional screen dots 10.

By chosing the white and the black voltage to an optimal extent it is possible to get two adjacent blackened dots to overlap each other. It thereby becomes possible to build up optional platterns 11 from screen dots 10, which together form text, graphic illustrations and half-tone images.

Figure 3A:
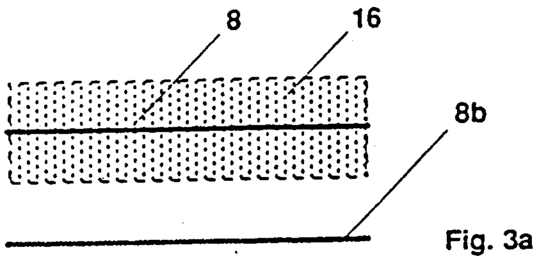
FIG. 3*a* shows how the presence and absence of an electric field is illustrated around electrodes in FIGS. 3*b*–3*d*.

Each conductor arranged in an electrostatic field influences the geometrical configuration of this field. The path of each field line in the room is controlled by a number of conditions and parameters, whereby the potential of the conductor constitutes such a parameter. As a certain field strength is required to release the pigment particles from the developer it is possible schematically for a certain potential at a conductor, i.e. an electrode, to define an area around said electrode in which area may pass no field lines of sufficient field strength for bringing about a blackening. FIG. 3*a* shows how this area has been defined graphically with a dashed band of field lines 16 around an electrode 8 with white voltage. If the potential applied to the electrode intends to allow passage of field lines of sufficient field strength for obtaining a blackening, this is in FIG. 3*a* shown only as a grey-toned line 8*b*, which represents the very electrode, In FIGS. 3*b*, 3*c* and 3*d* this symbolism is used for the purpose of showing examples of how the passages may be accomplished through the electrode matrix.

Figure 3B:
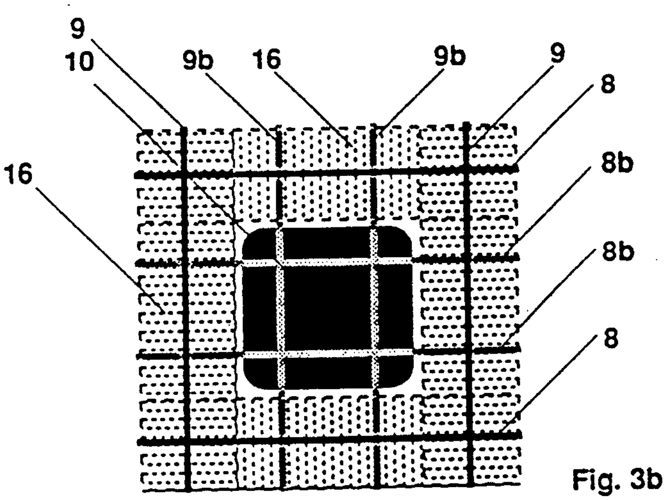
FIGS. 3*b*–3*d* show schematically portions of electrode matrices and how the electric fields thereof may cooperate for the purpose of creating a passage of different size. This control is called dot size control.

FIGS. 3*b* shows an exaggerated part of a matrix with four electrodes in each layer. Two electrodes 8*b* in one of the layers and two electrodes 9*b* in the other layer (arranged transversally to the first ones) have been connected to black voltage. The other electrodes 9 and 8 resp. are connected to white voltage, and have thus been surrounded with dashed areas 16 according to FIG. 3*a*. Hereby it has been created a passage for the field acting upon the pigment particles through the matrix represented by the screen dot 10.

Figure 3C:
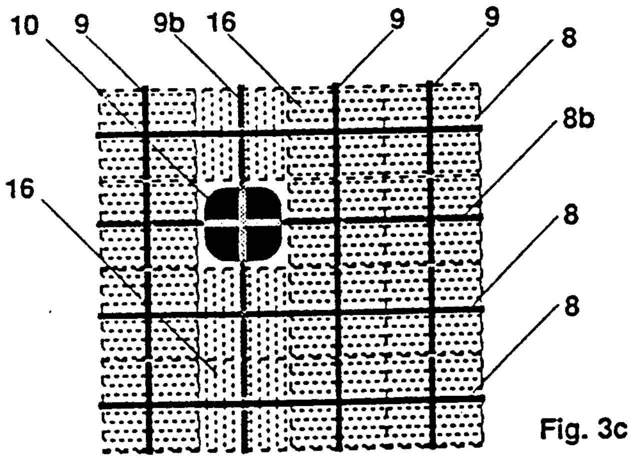
Figure 3D:
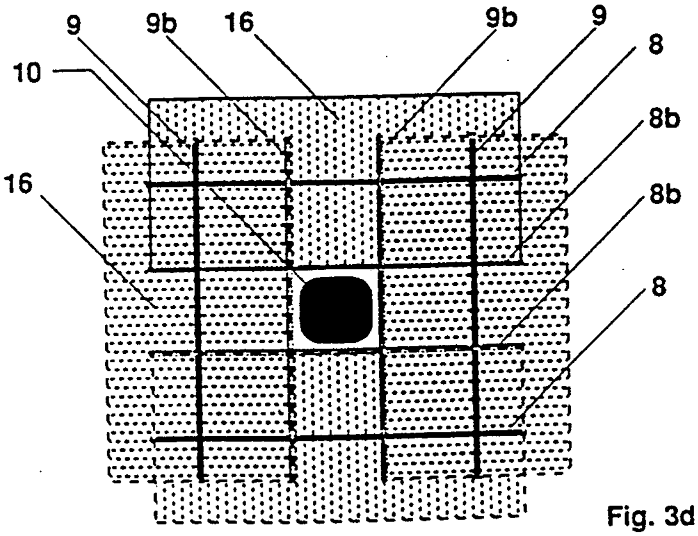

Another control philosophy is shown in FIG. 3*c*, where only one electrode 8*b* and 9*b* in each layer have been connected to black voltage. The screen dot 10 then will be situated such as shown over the crossing point between the two electrodes 8*b* and 9*b*. In FIG. 3*d* is shown how the potential has been changed at the electrodes 8 and 9 thus that the "blocking" area 16 has been made wider as compared to the earlier figures. The screen dot 10 is hereby reproduced smaller than in FIG. 3*b* in one of the screen meshes. This capability of the invention is called dot size control.

Figure 3E:
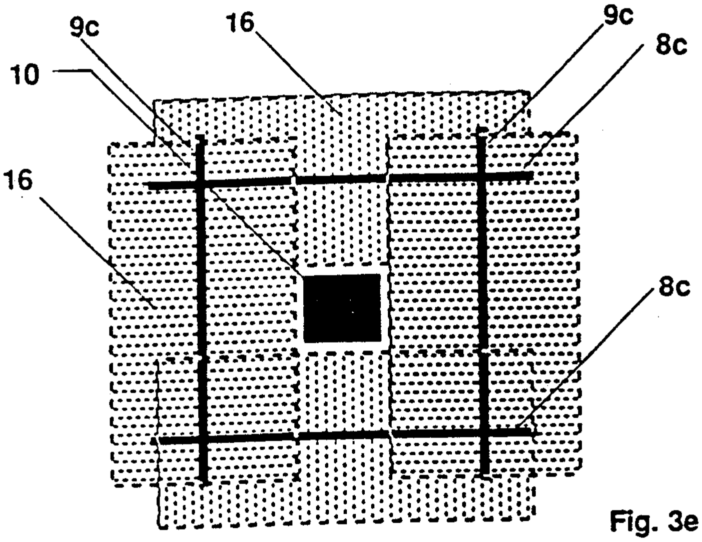
FIGS. 3*e*–3*g* show schematically portions of electrode matrices with only four electrodes representing one mesh and how asymmetric applied voltages on the electrodes can create passages with different position within said mesh. This control is called dot position control.
Figure 3F:
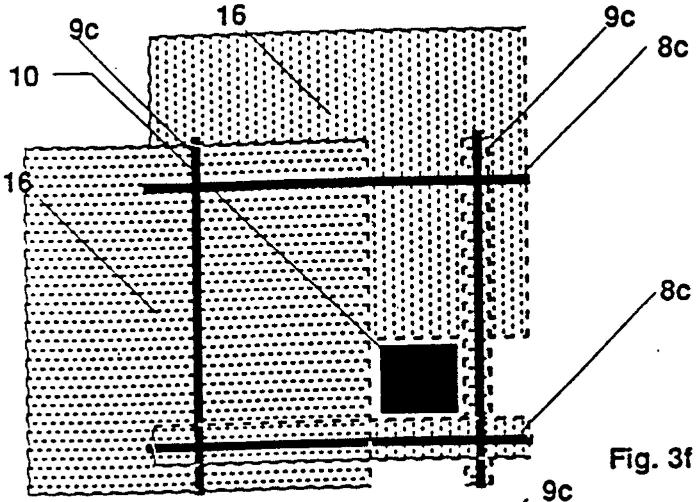
Figure 3G:
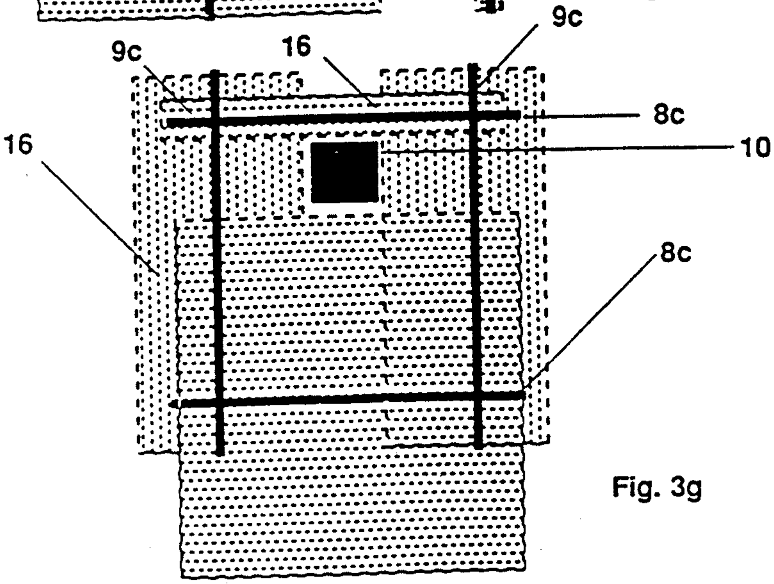

FIG. 3*e*-3*g* shows another capability called dot position control. In the same manner as the fringing field passage through the screen can be shrinked by changing the applied voltage equally on all electrodes adjacent to the desired dot, the dot can also be positioned asymmetric within the actual mesh of the screen by applying nonsymmetrical potentials to the actual electrodes. FIG. 3*e* shows a small dot 10 reproduced in the middle of a mesh surrounded by four electrodes 9*c* and 8*c*. These electrodes are connected to a voltage in between the white and the black voltage. The blocked area 16 around each electrode is in this case equal In FIG. 3*f* the voltage on the upper 8*c* and left 9*c* electrode has been changed over to more white voltage resulting in wider blocked areas 16. The lower 9*c* and right 8*c* electrodes have been changed to more black voltage compared with FIG. 3*e*. This asymmetric control replace the dot 10 from the middle to the lower right coner of the mesh. FIG. 3*g* shows a similar situation where the dot 10 has been moved to an upper middle position.

The function of the electrode matrix to some extent can be compared to the thin thread, named grid, that encloses the cathod of an electron tube. Comparatively low voltage levels at the electrodes in the matrix can control the position and form of the field lines. Typical values can be $V_1=OV$; $V_2=-1000V$; $V_3=+50V$; $V_4=V_1=OV$.

Another principle which is provided by the method is shown in FIG. 7, 8*a*, 8*b*, 9*a* and 9*b*. In this embodiment the electrodes of the scanning layer should be considerably wider, preferably with a rectangular cross-section, than the electrodes of the control layer. The space between the electrodes however should be the same for both layers. The layers may not be interwoven at this principle.

Figure 9A:
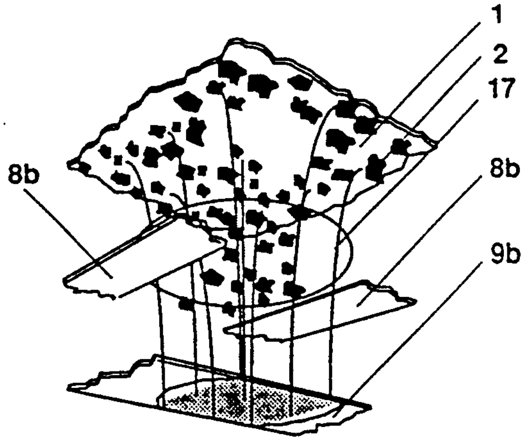
FIG. 9*a* shows the fundamental attraction of the field lines, when blackening is effected at use of an electrode matrix according to FIG. 7 without paper.

The electrodes of the scanning layer are hereby used as a discrete plate electrode, whereby the electrode 9*b* momentarily activated during the scanning shall be connected to a black voltage, which generates the same field strength on the pigment particles 2 as that generated by the plate electrode used in the previous embodiment when one or more electrodes in the control layer are connected to white voltage. As the electrode 9*b* in this case creates a line-shaped field, the overlaying electrodes 8, connected to a white voltage in the control layer 4, can be brought to screen off the field shown in FIG. 8*a*, whereby the field lines 18 extend from the electrode 9*b* to the most adjacent electrode in the control layer 8. By connecting one or more electrodes 8*b* in the control layer 4 to black voltage the field lines 17 will be able to reach the pigment particles 2 on the developer 1, which is shown in FIG. 9*a*.

Figure 8B:
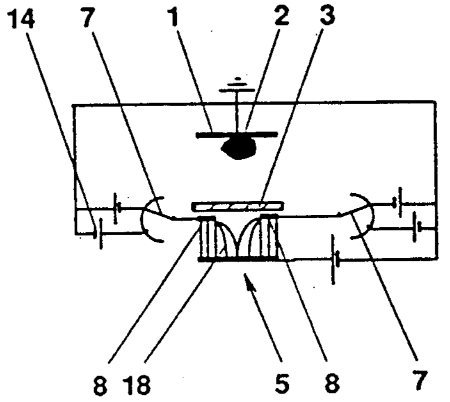
FIG. 8*b* shows the schematic connection against voltage sources in the state shown in FIG. 8*a*.
Figure 9B:
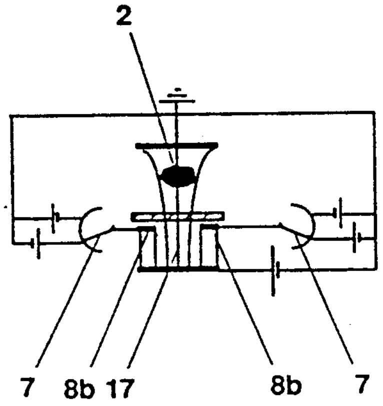
FIG. 9*b* shows the schematic connection against voltage sources in the state shown in FIG. 9*a*.

In FIG. 8*b* and 9*b* is shown a schematic embodiment, where each electrode via the switch 14 can take up only two states. Each electrode is via a two-position switch in connection with two preset voltage sources 14. Just like the method defined in the case with the plate electrode located behind, the black voltage must be connected via a high frequent scanning repetitive cycle course through all electrodes of the scanning layer 5.

Figure 10A:
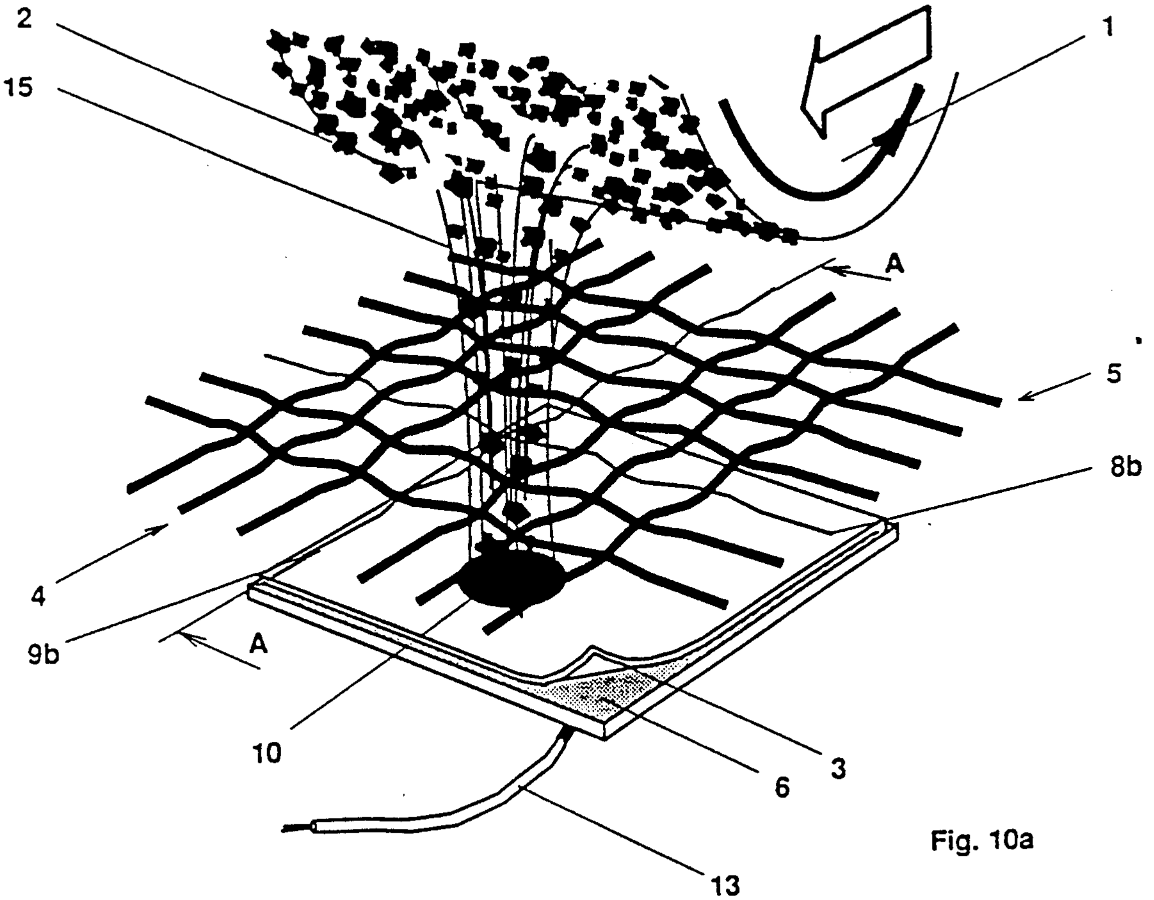
FIG. 10*a* shows a netformed electrode matrix laying above the paper and the plate electrode and a portion of a developer in perspective. The figur illustrates how the pigment particles are sucked over from the developer down through the electrode matrix to the desired dot.
Figure 10B:
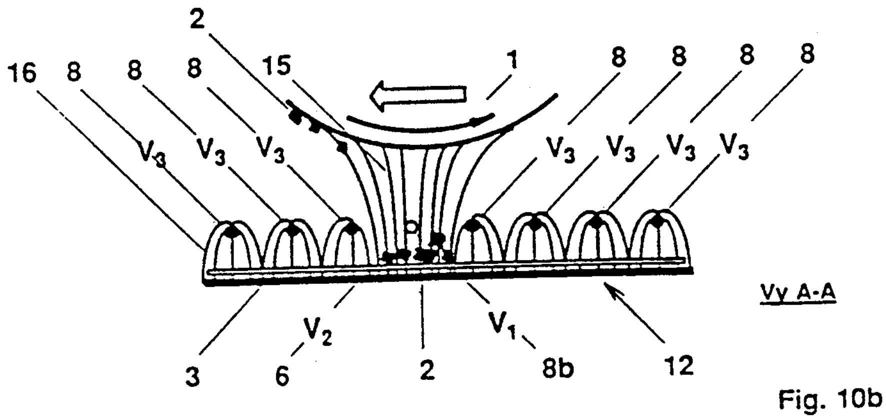
FIG. 10*b* shows a section along line A—A in FIG. 12*a* from which the fundamental appearance of the field lines can be seen.

Still another principle made possible by the method is based on that the elecrode matrix shall be provided between the developer 1 and the paper 3. The electrode matrix 4, 5, which can either be a woven net or a multilayer matrix, hereby shall have permeability regarding the pigment particles 2. A device according to this method with a woven net is shown in FIG. 10*a*. The electrodes 4 and 5 then shall be considerably thinner cross-sectionally than the space between each pair of electrodes. According to this principle either the paper shall be charged with a potential, which gives a good blackening through the net 4, 5, e.g. by using the conductivity of the paper itself, or the paper 3 may be applied and e.g. fixed by electrostatical forces, on a plate electrode 6, which generates sufficient field strength for blackening through the electrode matrix 4, 5. The matrix 4, 5 during the course of the development will shade off the field lines 16 from the paper and from the plate electrode 6 resp. at the screen points, which are not intended to be blackening as the field line 15 are allowed to penetrate the net at the screen points 10 intended to be blackened. This is shown in FIG. 10*b*. By adapting the space between the net 4, 5 and the paper 3, the field line 15 can be caused to enclose the electrode 8*b* and thereby to counteract the electrode 8*b* from appearing as a white line in the screen point 10. By reversing polarities on electrodes with black voltage any residual pigment particles on the electrode matrix 4, 5 may be recovered to the developer 1 if this is allowed to pass one more times over the matrix after the particles have been fixed on the paper.

FIGS. 10*a* and 10*b* show devices with overlaying developers 1 in order to obtain a good overall view and comparability between the different embodiments, but it is more convenient to turn the device upside-down in this embodiment as the risk for undesirable contamination from pigment particles falling down is reduced.

By exchanging the switch 7 for a proportionally controllable driving device, the size of every separate screen dot can be variable in the manner mentioned above.

Figure 7:
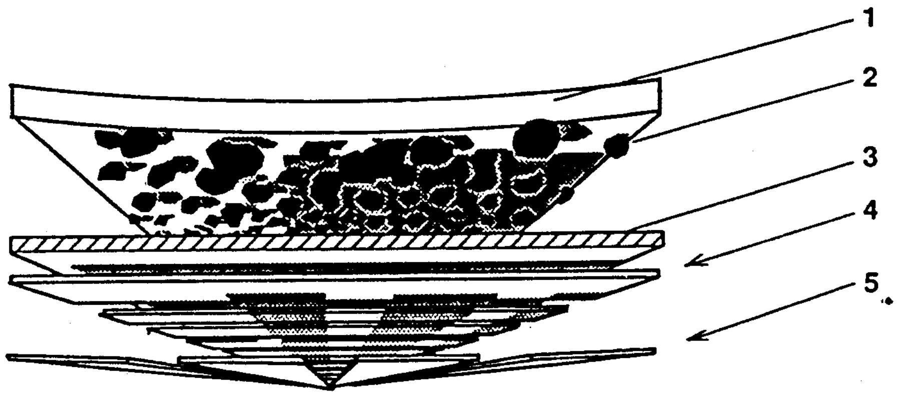
FIG. 7 shows a portion in perspective of an electrode matrix and developer without plate electrode.
Figure 8A:
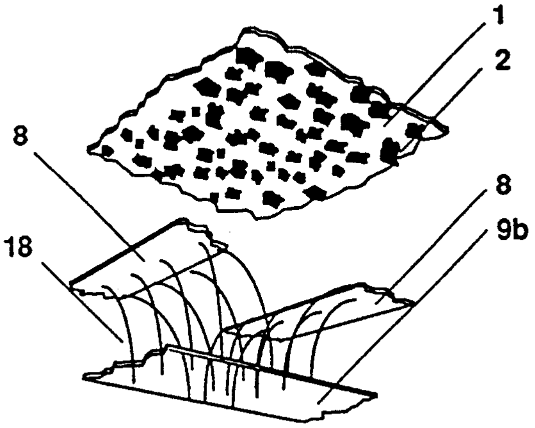
FIG. 8*a* shows the fundamental attraction of the field lines, when no blackening is brought about at use of an electrode matrix according to FIG. 7 without paper.

Common for all manners of use according to the invention, which are not necessarily limited to those described herein, is that development can be effected either directly or indirectly. In the direct method, which is shown in FIG. 1 and FIG. 7 the information carrier, e.g. the paper 3 is applied to the surface of the electrode matrix prior to development. The field penetrating through the electrode matrix then can be caused to deposit screen dots 10 in the surface of the paper. Hereby it is possible to use, e.g. either so called overhead film, common copy paper or a particular dielectric paper. In order to ascertain the contact and position of the paper relative to the surface of the unit 12 it is possible to use vacuum suction.

Figure 5:
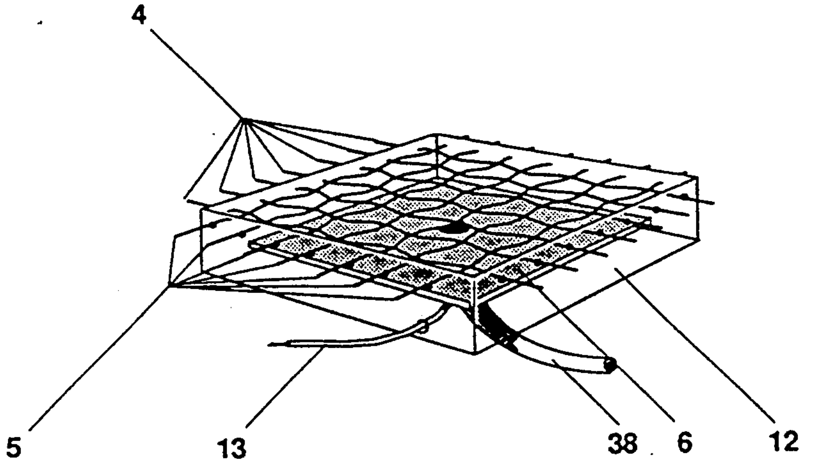
FIG. 5 shows the electrode matrix only and its vacuum connection in FIG. 4*a* in perspective.
Figure 6:
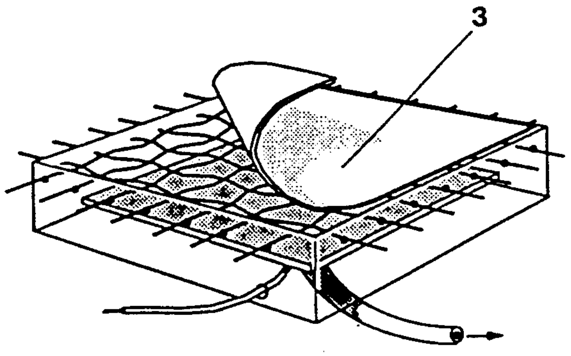
FIG. 6 shows the electrode matrix of FIG. 5 coated with a paper.

This is shown in FIGS. 5 and 6. The unit 12 hereby can be formed either in a porous material, which is sealed off at all sides except for that which is intended to support or retain the paper, or as suction channels designed particularly for the purpose and being formed as shallow, preferably semicircular recesses in the surface facing the paper, which recesses are connected to the connection 38 of a vacuum pump.

At the indirect method, which is shown in FIG. 4*a*, the image or the text is first developed on an information carrier, which is constituted by a conveniently designed surface on the unit 12. Subsequently the noncured pigment particles 2 are tranferred to the paper 3. By using conventional transfer technique with so called corona units, the efficiency for the transferred pigment particle amount may be increased in that the attraction force between the surface of the electrode matrix and the particles is abrogated or replaced for a repelling force. This is brought about at the moment of transfer by connecting all electrodes to a conveniently chosen repelling voltage for the purpose.

Figure 11A:
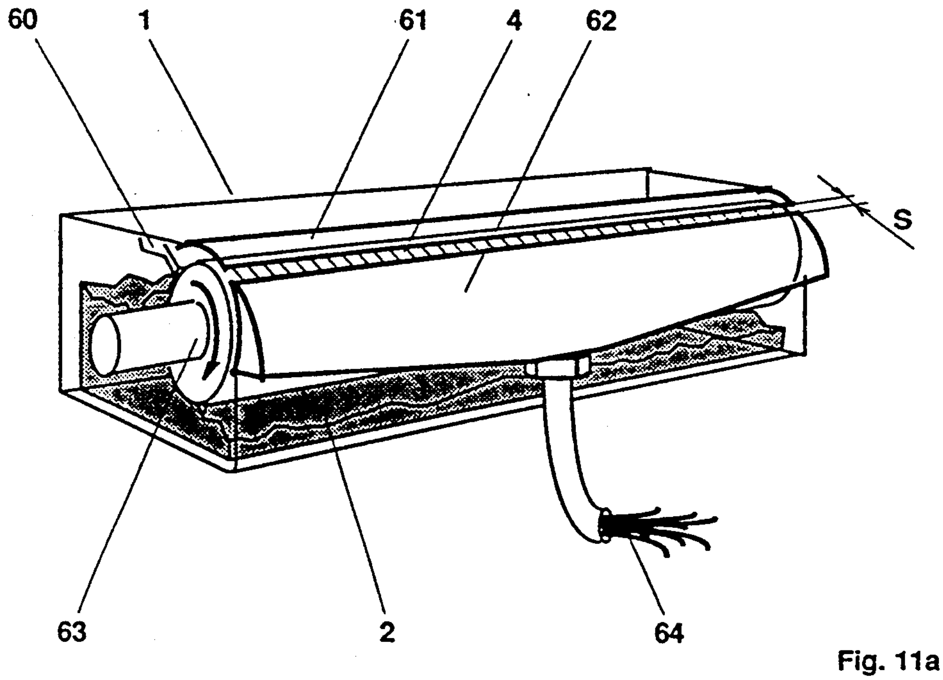
FIG. 11*a* shows a developer provided with a single-row electrode matrix and screening means.
Figure 11B:
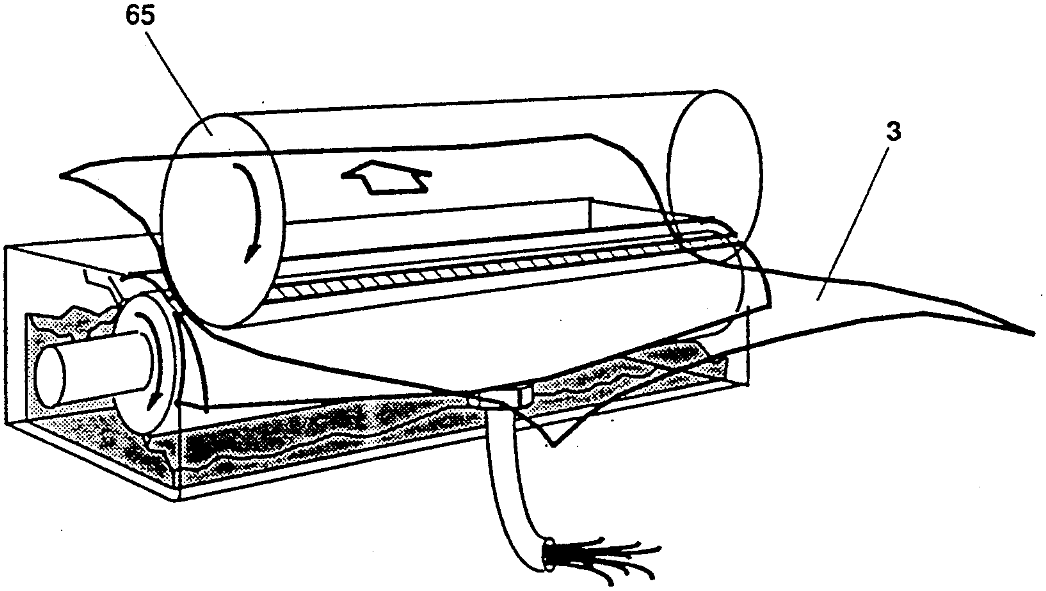
FIG. 11*b* shows a paper during development in a device according to FIG. 11*a*.

By limiting the distance along which the paper can be developed at every moment of time, to one screen dot row only in the direction of movement for the paper, it is possible, at a somewhat larger time consumption, to produce with a considerably simplified device the same result as described above. Such an embodiment is shown in FIGS. 11*a* and 11*b*. A conventional developer 1, which is not limited to the type shown in the figures, has been equipped with two screening devices 61 and 62. These are preferably constituted by thin-walled electrically conductive casings curved in one direction, which are arranged partially to enclose the conveyor roller 63 at a small distance from this roller. The screening devices 61 and 62 are arranged to form between them a slot of the width S, and which substantially corresponds to the length of one side of the screen dots and that said slot is mainly parallel to the rotational axis of the roller 63. Between the two screening devices 61 and 62 are fitted thin parallel electrodes in a layer 4 to be stretched over said slot with an interspace which corresponds to the space between the screen dots. The electrodes in the layer 4 are connected to the cable 64 inside the screening device 62 via a signal treating device (not shown in the figure).

By moving the paper step-wise, e.g. by means of a stepping motor at a controlled distance from the slot S and the electrodes, one screen dot row can be developed at the time by controlling the potential of the electrodes by means of an earlier described control unit connected to the cable 64. An electrode hereby must be fitted to the rear side of the paper 3, as seen from the developer). This electrode may preferably be designed as a roller 65, which fixes the paper 3 to its envelope surface with vacuum or electrostatical forces. The roller 65 or another device for conveying the paper 3 in front of the slot hereby shall be connected to a voltage attracting the pigment particles.

Figure 12A:
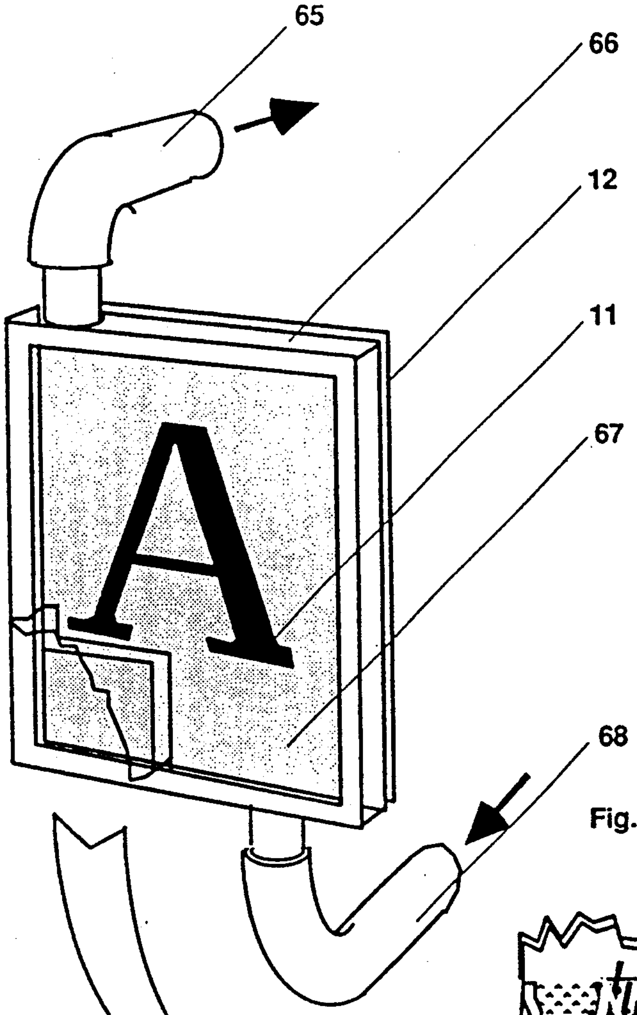
FIG. 12*a* shows a display unit according to the invention.
Figure 12B:
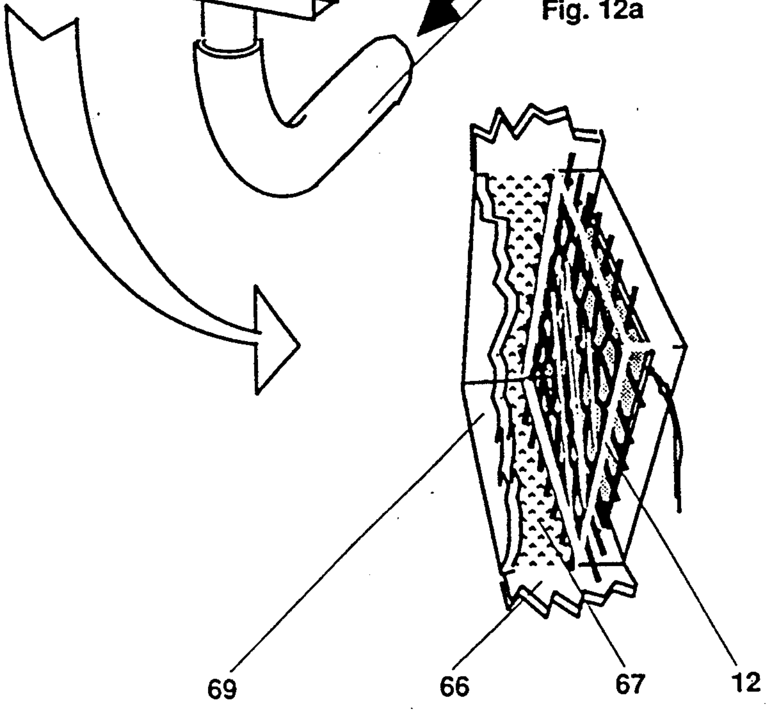
FIG. 12*b* shows the lower left corner of the display unit in FIG. 12*a*, where this has been exaggerated and turned for the purpose of showing the location of the components forming part thereof.

In FIGS. 12*a* and 12*b* is shown an embodiment of the invention where the purpose is to visualize text and/or graphics for an operator. The most common use is thereby to use the device as a viewing screen or a display units. This embodiment differs from those earlier described in as far as the pigment particles never are allowed to be permanently fixed to the information carrier. The information carrier in this embodiment is constituted by a smooth surface on the electrode unit 12, e.g. a white polished teflon coating, which has but small suspectability to bind the pigment particles. This device furthermore requires rather rapid development processes, whereby the traditional method to use a developer which is movable relative to the information carrier is not always practical. FIG. 12*a* shows a method which is based on that a pigment particle containing atmosphere 67 with good visual permeability all the time is exposed to the information carrier on the surface of the electrode unit 12. For obtaining the desired atmosphere 67 the space in front of the information carrier has been delimited with a frame 66 and a glass pane 69. The electrode unit 12 can be constructed in the same manner as shown in FIG. 4*a*, whereby it is possible to concentrate the pigment particles from the atmosphere 67 to the desired pattern configurations 11. It also is possible to repel earlier developed patterns by connecting suitably chosen repelling voltages to the electrodes in question in the electrode matrix. The pigment particles hereby will be given off to the atmosphere 67. In order to ascertain the visual permeability and at the same time to arrange for an uniform particle distribution in the atmosphere 67 it is desirable that the particles are charged thus that they repel each other. It is also desirable to provide the glass 69 with a transparent conductive layer of e.g. "ITO"—$IN_2O_3(SnO_2)$ and to connect this and the frame 66 to a voltage acting repelling on the particles. The atmosphere 67 furthermore should be kept circulating via connecting devices 68 and to be injected in the space in front of the information carrier via suitable nozzles (not shown in the figure).

FIGS. 13*a*–13*d* and 14*a*–14*d* show more practically design examples of a complete print cartridge based on the invention. It is commercially motivated to offer disposal cartridges including all items with limited lifetime or toner contamination risks. The life time of the cartridge is equal to the life time of the contained toner amount (normally 400 copies). This philosophy is common in laserprinters and copy machines. If this philosophy will be applied to this invention the items included in the cartridge has to be low cost. I.e. no electronics and driver IC's are recommendable to be included in the cartridge. This means that each electrode has to be individually connected to the controller interface in the printer. Furthermore when designing multi pin connectors 74 for manual connection it is preferable to minimize the number of electrodes, i.e. the number of pins within each cartridge.

One method to achive larger electrode pitch than the final printed dot pitch is to use a non aligned mesh pattern with a non transverse net. By controlling the electrodes in a scanning manner with respect to motion of the paper two adjacent dots in the final print is not printed simultaneously. This control is called dot tracking control. FIG. 13*c* shows a schematic portion of the print slot. The line with black squares named tl–t8 represent dots 10*b* in one horizontal line on the paper. Two adjacent dots, for example t5 and t6 are printed within the time it takes to move the paper with the actual paper speed one mesh pitch. The black squares 10*a* represent the actual mesh position where the dot is printed. In this example 13*c* the print slot is 8 dots wide reducing the vertical electrode number with a factor 8. A typical value for a 200 dots per inch A4 size printer is 1666 dots per horizontal line. When using the electrode configuration described in FIG. 13*c* the total number of electrodes will be reduced to 217.

Figure 13A:
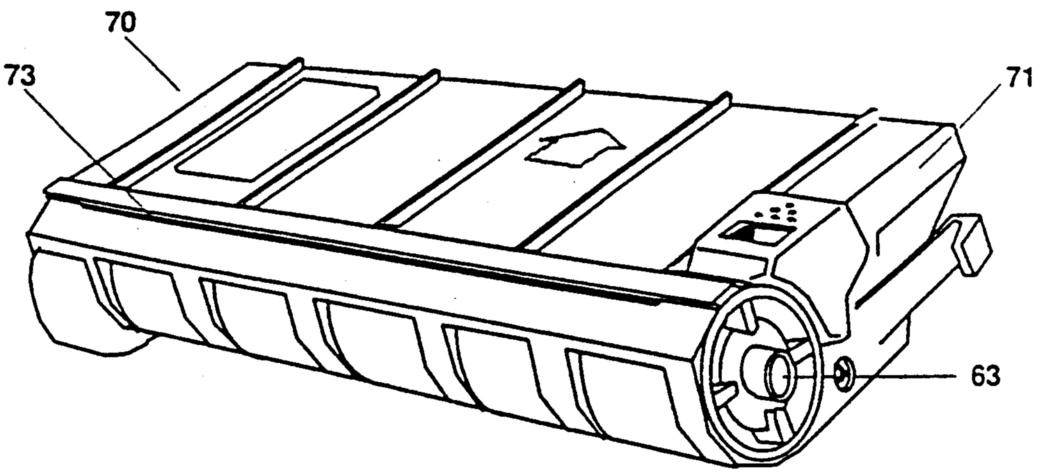
FIG. 13*a* shows a complete print cartridge according to the invention.
Figure 13D:
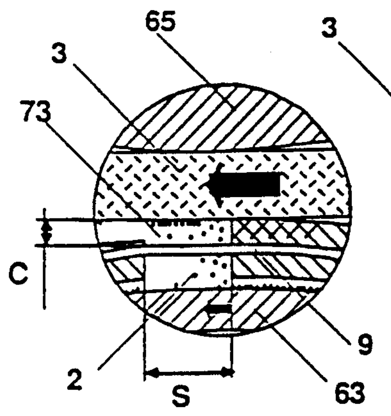
FIG. 13*d* is an enlarged detail of the encircled region in FIG. 13*b*
Figure 13B:
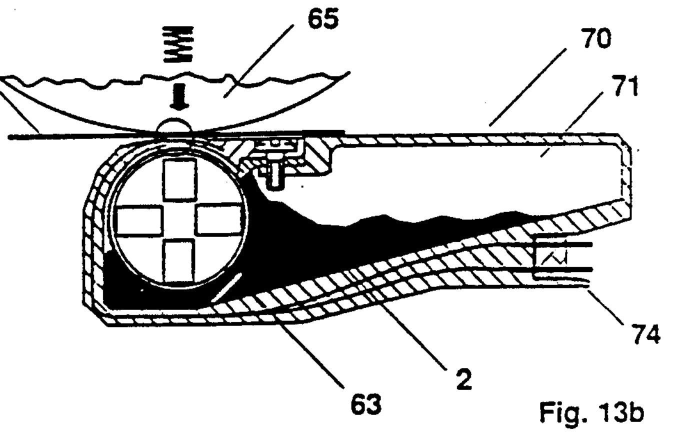
FIG. 13*b* shows a cross section of the cartridge in FIG. 13*a*. The print slot is magnified in order to show the details.
Figure 13C:
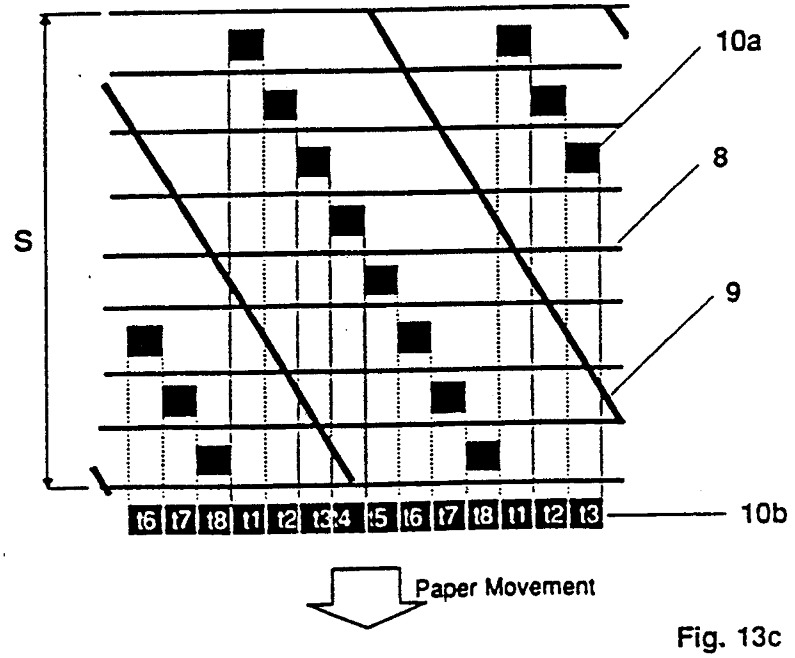
FIG. 13*c* shows schematically portion of the electrodes arranged in a angular configuration within the print slot.
Figure 14A:
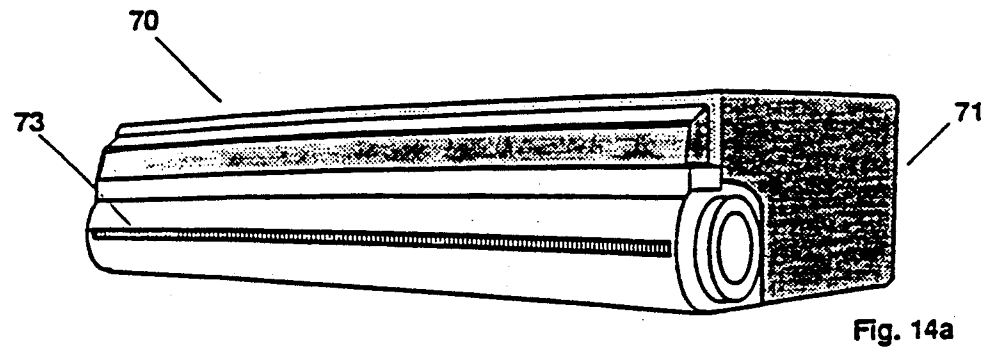
FIG. 14*a* shows a complete print cartridge with electrode cleaner.
Figure 14D:
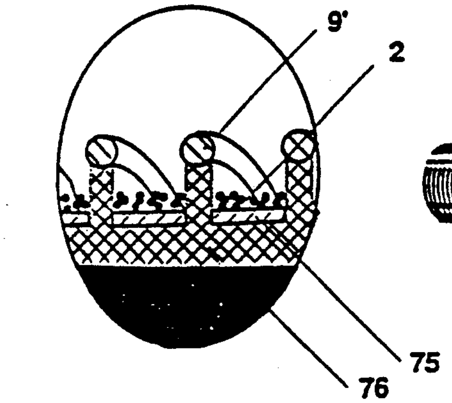
FIG. 14*d* is an enlarged detail of the encircled region in FIG. 14*b*.
Figure 14B:
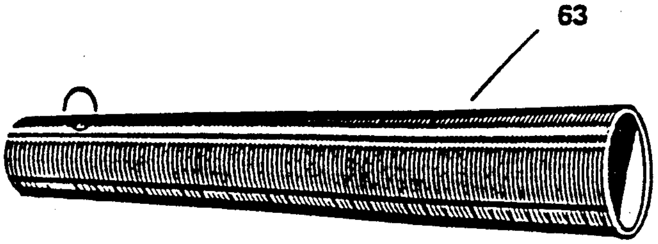
FIG. 14*b* shows the roller in the cartridge in FIG. 14*a*. The concentric electrode configuration is partly magnified in order to show the details.
Figure 14E:
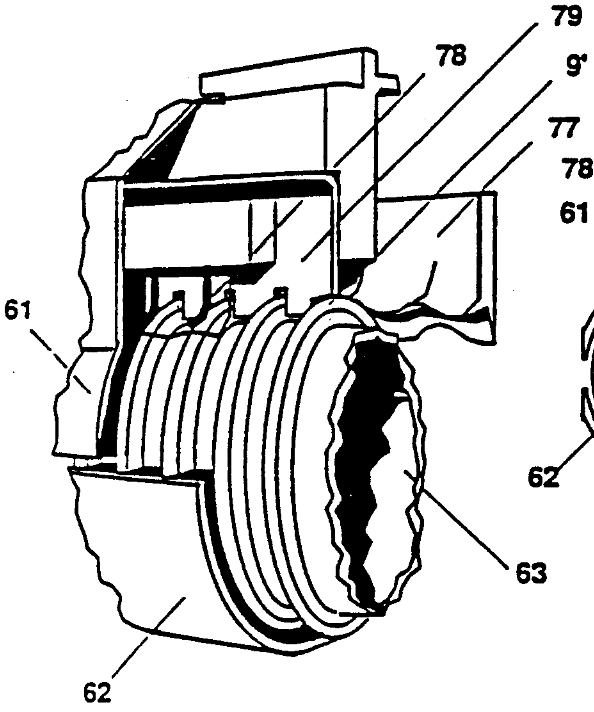
FIG. 14*e* is a fragmentary perspective view of the assembly of FIG. 14*c*.
Figure 14C:
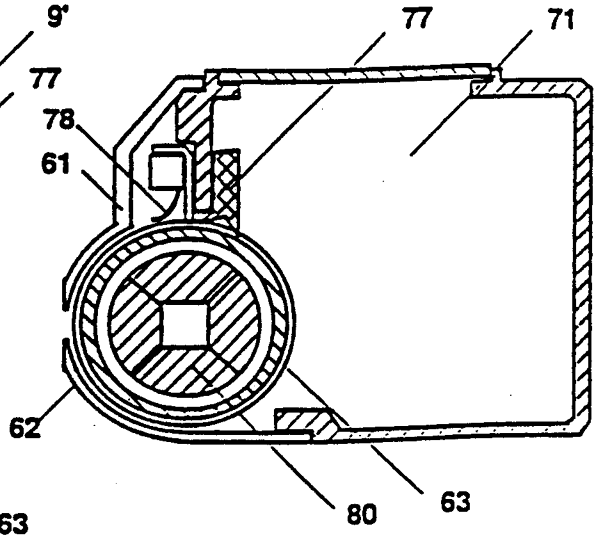
FIG. 14*c* shows the assembly including the cleaning blade for the roller in FIG. 14*b*.

The cartridge in FIG. 13*a* has a 8 mesh wide (S) printing slot 73. The paper 3 is transported over the printing slot 73 by a roller shaped backing electrode 65. The clearance (C) between the paper and the electrodes is settled by a sliding edge constituting one of the sides in the printing slot 73. This configuration is shown in FIGS. 13band 13d.

If a non disposal print unit 70 is preferable it can be suitable to integrate some kind of cleaning device within the cartridge. FIG. 14a–14d show solutions with concentrical electrodes 9′ integrated on the developer roller 63. Each electrode 9′ is supported by an insulating member 76 forming a valley between each electrode 9′. At the bottom of each valley a concentrical conductive layer is applied in order to replace the conductive characteristics of a standard developer roller. The blade 79 assuring the amount of toner 2 on the roller 63, thereby has to be groove shaped. A cleaning blade 77 is attached to assure a contamination free surface of the electrodes when the roller 63 rotates. Achieving a galvanic contact with each electrode 9′ can be performed with either sliding brushes or the like 78 or some kind of internal swiveling connector. The shields 61 and 62 are arranged at a large distance so a repelling voltage normally is applied in order to assure contamination free operation of this unit.

Figure 15:
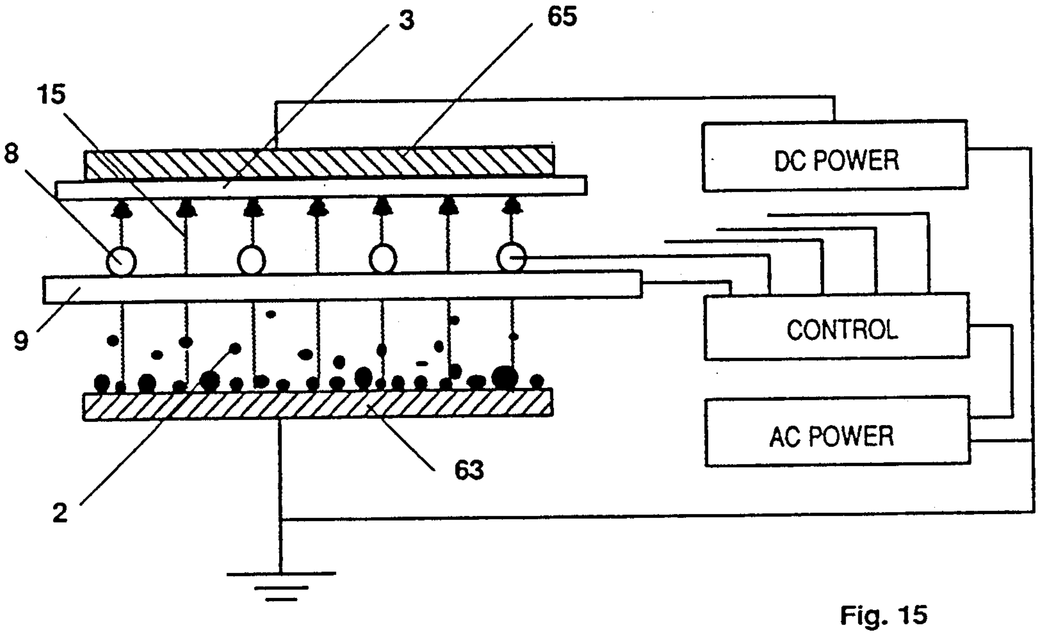
FIG. 15 shows schematically how an AC power can be applied and biased between the developer roller and the electrodes in order to increase the speed of toner transfer.

FIG. 15 shows a method to increase the printing speed of the invention. By applying a AC power in series with the control voltage to each electrode i.e. between the electrodes 8, 9 and the developer roller 63 the field treshold for releasing and transporting each toner particle 2 from the roller 63 to the paper 3 will increase. Typical values for this bias voltage is 2–5 kHz in frequency and 500–2000 V in peak to peak voltage. It can also be preferable to offset the middle value of this AC some hundred volts.

The invention is not limited to the embodiments described herein with matrices constructed from metallic conductors. It is thus possible e.g. to realize electrode matrices, the matrix structure of which consist of conducting, semiconducting or other resistively or conductively actuatable materials, gases or fluids within the scope of the invention. Due to the fact that a conductor acts as a screen for an electric field it may also be possible to combine the matrix with other materials, the conductivity of which in screen form is actuatable for the purpose of screening off said field. Thus an intermediary layer of liquid crystals, the mutual electric contact of which can be interrupted is applied between the electrode layers. It may further be desireable also to integrate a layer somewhere in the electrode unit 12, which has for purpose to equalize field pulsations caused by the repetitive potential variations of the scanning sequence in the electrodes.

I claim:

1. A method for producing a latent electric charge pattern from electric signals and developing this on an information carrier by means of pigment particles, characterized therin, that the information carrier (3; 12) is brought to electric cooperation with at least one screen- or lattice-shaped matrix, preferably an electrode matrix (4, 5, 6;4, 61, 62), which due to control in accordance with the configuration of the desired pattern, at least partly opens and closes passages through the matrix, by means of galvanic connection thereof to at least a voltage source, and that through the passages thus opened is exposed an electric field for attraction of the pigment particles against the information carrier.

2. A device for performing the method according to claim 1 at production of a latent electric charge pattern from electric signals and developing this upon an information carrier by means of pigment particles, characterized therein, that there is provided at least one screen-shaped or lattice-shaped matrix (4, 5,6; 4, 61, 62), preferably an electrode matrix, the screen or lattice wires (8, 9) of which are galvanically connectable to at least one voltage source via a control unit (30), which is adapted in accordance with the configuration of the desired pattern at least partly to open and close passages through the matrix (4, 5,6; 4, 61, 62), and that an information carrier (3;12) is located or arranged in electric cooperation with the matrix, thus that an electric field for attraction of the pigment particles against the information carrier is exposed through the passages thus opened.

3. A device as claimed in claim 2, characterized therein, that the elecrode matrix (4, 5), which incorporates linear electrodes in at least two intersecting layers, which form a bar pattern with a big number of squares and crossing points, is adapted to build up around each electrode in at least one of the layers an electric field, which prevents a force-generating field from attracting pigment particles, and that the permeability of the matrix passages for the electric field acting upon the pigment particles is variable and by means of a control unit (30) is controllable in accordance with the configuration of the desired pattern, thus that said field through "opened" passages, e.g. squares and/or areas around crossing points has the ability to transport pigment particles to an information carrier (3;12) located in the field.

4. A device as claimed in claim 3, characterized therein, that the potential of each separate electrode is selectively controllable by means of a proportional driving unit for varying the size and the position of each passage, e.g. each screen point, in accordance with the control signals emitted by the control unit (30), which signals correspond to the configuration of the desired pattern.

5. A device as claimed in claim 3, at which the developed electro-static charge pattern is fixable, characterized therein, that certain electrodes in the electrode matrix (4, 5) also have the function of heating elements, or that such heating elements are provided separately in the matrix.

6. A device as claimed in claim 2, characterized therein, that the electrode matrix incorporates at least two layers (4, 5) having a plurality of wire-shaped electrodes electrically insulated from each other and mainly arranged in parallel in the plane of each layer, that the wire-shaped electrodes in one of the layers (4) are arranged at an angle to the electrodes of the other layer (5), and that each separate electrode is selectively connectable by means of a switch gear (7) to at least two voltage levels independent of each other, in accordance with control signals emitted by a control unit (30).

7. A device as claimed in claim 2, characterized therein, that an electrode plate (6) and one of the layers (5) of the electrode matrix resp. are arranged at one hand as antipole for the potential of both layers or of one layer (4, 5; 4), and on the other hand as antipole for the potential of the developer (1).

8. A device as claimed in claim 2, characterized therein, that the information carrier (3;12) is intended to be located between the electrode matrix (4, 5) and the developer (1), alternatively on the side of the electrode matrix (4, 5) facing away from the developer (1 , whereby the pigment particles (2) are arranged to pass through the matrix.

9. A device as claimed in claim 2, characterized therein, that development is intended to be effected by concentration of pigment particles (2) on an information carrier in a pigment particle containing atmosphere (67), which atmosphere preferably has a good visual permeability.

10. A device as claimed in claim 9, characterized therein, that the electrode matrix (4, 5) is arranged to repel pigment particles concentrated on the information carrier and thereby to return them to the ambient atmosphere (67).

11. A device as claimed in claim 2, characterized therein, that the matrix (4) is single-row and incorporates at least two mainly parallel wire-shaped electrodes, which are electrically insulated from each other and at least two screening devices (61, 62) arranged entirely or partly to enclose a conveyor (63) for pigment particles, and that said screening devices are arranged to form between them a slot in which the electrode matrix (4) is provided.

12. A device as claimed in claim 2, characterized therein, that the electrode matrix (4, 5) in the transfer direction of the information carrier is limited to a smaller number of rows of matrix passages, that the electrode matrix 4, 5) is provided in a slot (S) in a screening device (61, 62), which screens off the developer (1, 63) from at least one backing electrode (65), that the supply to the electrodes (4, 5) of the electrode matrix is controlled relative to the transport speed of the information carrier (3) in front of the slot (S), and that the linear wire patterns of the electrode matrix are arranged to intersect each other under an angle other than a right angle.

13. A device as claimed in claim 2, characterized therein, that the electrode matrix is a cylinder (63) and the electrodes (9') are concentric, annular projections spaced apart by grooves in which are provided concentric, electrically conductive layers (75), which form parts of the developer of the device.

14. A device as claimed in claim 13, characterized therein, that wiper members (79) and/or cleaning means 77) are situated or insertable in the grooves of the cylindrical electrode matrix (63) between the annular electrodes (9').

15. A device as claimed in claim 2, characterized therein, that the electrodes (8, 9, 63) are connectable to an alternating current in series with a control current.

* * * * *